Sept. 26, 1967  A. EISELE  3,343,269
BORE-INSERTED SURFACE PERPENDICULARITY GAUGE
Filed Sept. 14, 1965  2 Sheets-Sheet 1
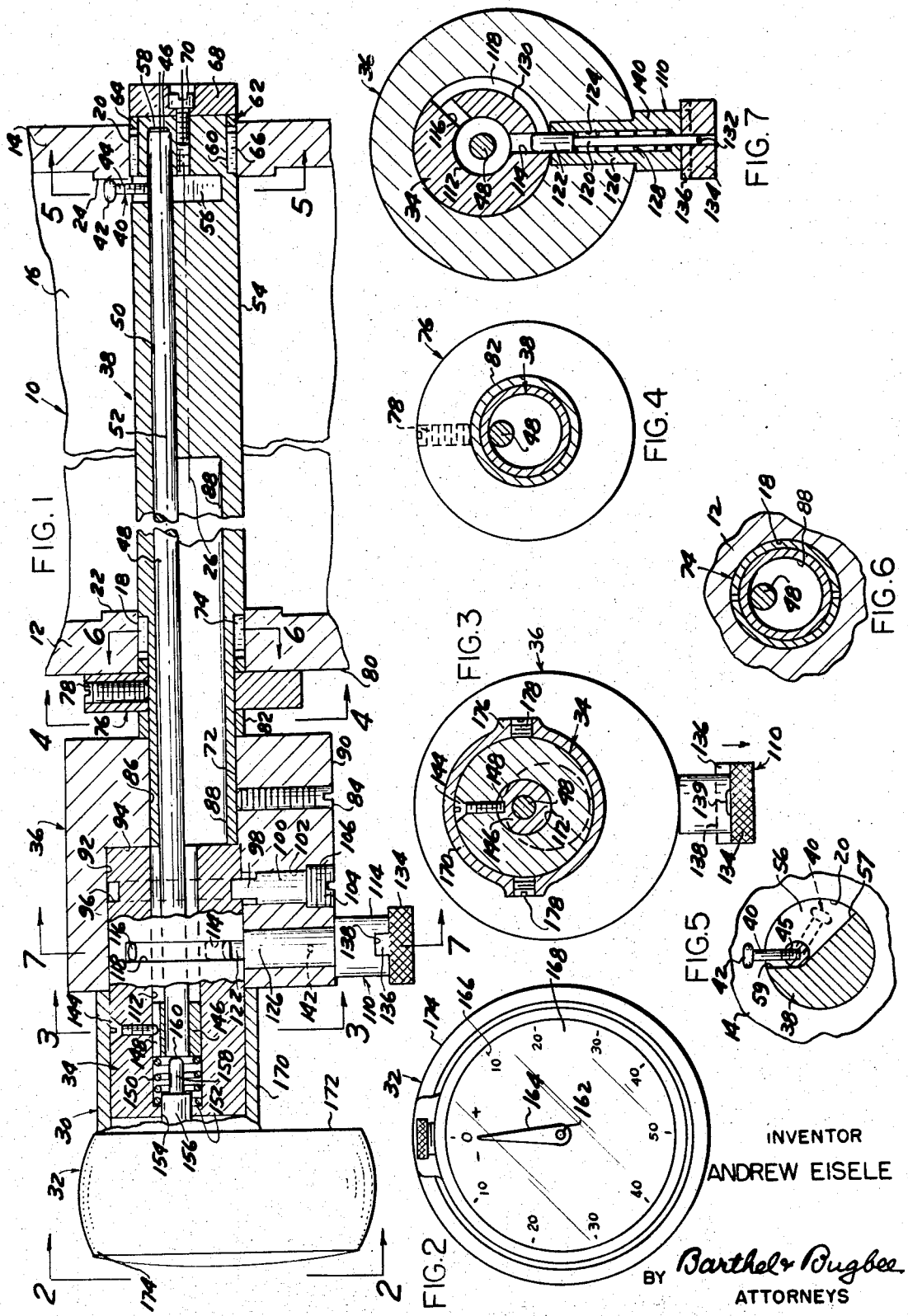
INVENTOR
ANDREW EISELE
BY Barthel & Bugbee
ATTORNEYS Sept. 26, 1967 A. EISELE 3,343,269
BORE-INSERTED SURFACE PERPENDICULARITY GAUGE
Filed Sept. 14, 1965 2 Sheets-Sheet 2

INVENTOR
ANDREW EISELE

BY Barthel & Bugbee
ATTORNEYS

United States Patent Office 3,343,269
Patented Sept. 26, 1967

3,343,269
BORE-INSERTED SURFACE PERPENDICULARITY
GAUGE
Andrew Eisele, 20460 Brookwood,
Dearborn Heights, Mich. 48127
Filed Sept. 14, 1965, Ser. No. 487,204
8 Claims. (Cl. 33—174)

ABSTRACT OF THE DISCLOSURE

A surface perpendicularity bore gauge measures a surface adjacent a bore for perpendicularity relatively to the axis of the bore, even when the surface to be measured is "blind," that is, it is behind a wall through which the bore passes and is accessible for measurement only through the bore.

This gauge has a hollow stem into which the perpendicularity measuring member or feeler is retracted while the adjacent portion of the stem is being passed through the bore to the inner end thereof, after which the feeler is extended into surface-perpendicularity measuring position behind the wall in which the bore is located.

This gauge also measures the perpendicularity of a surface or surfaces located between a pair of spaced coaxial bores leading into an otherwise inaccessible interior space within which the surface or surfaces are located and are accessible only through the bores.

---

In the following description of the accompanying drawings:

FIGURE 1 is a central vertical longitudinal section, partly in side elevation, of a surface perpendicularity bore gauge according to one form of the invention, where the surface to be measured is on the inner side of the wall farthest from the operator;

FIGURE 2 is a left-hand end elevation looking in the direction of the arrows 2—2 in FIGURE 1;

Figure 8:
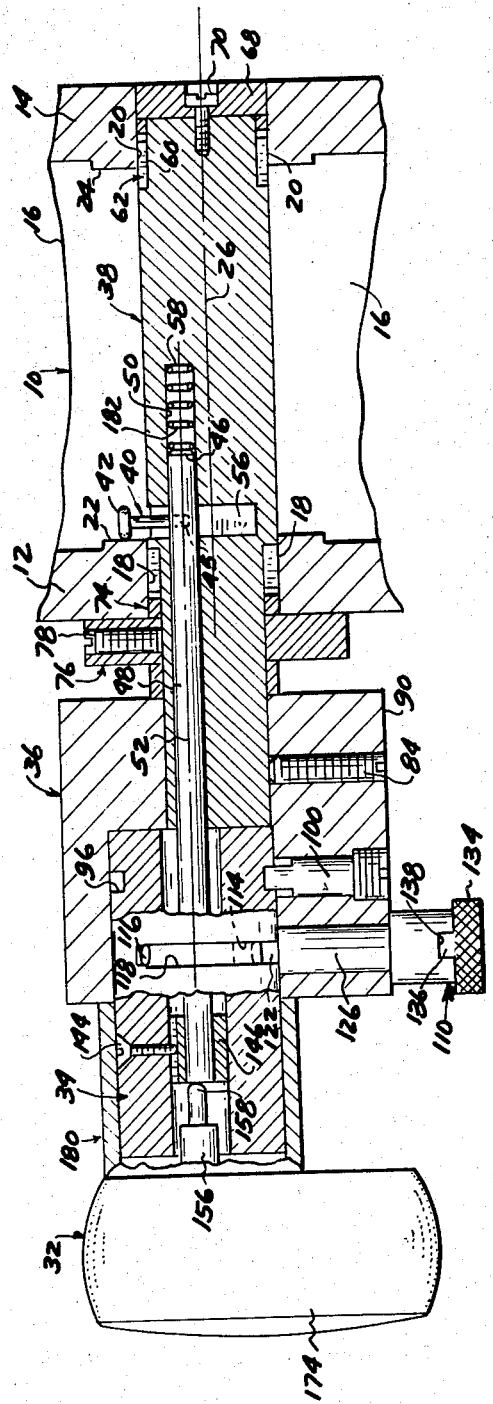

FIGURES 3, 4, 5, 6 and 7 are cross-sections respectively taken along the lines 3—3, 4—4, 5—5, 6—6 and 7—7 in FIGURE 1; and FIGURE 8 is a central vertical longitudinal section, partly in side elevation, of a modified surface perpendicularity bore gauge where the surface to be measured is on the inner side of the wall nearer the operator.

Referring to the drawings in detail, FIGURES 1 and 8 show a machine structure, generally designated 10, such as an engine crankcase, having nearer and farther walls 12 and 14 respectively interconnected by walls 16, only one of which is shown, and provided with coaxial reference bores 18 and 20 adjacent which in surrounding relationship are nearer and farther inner surfaces 22 and 24 respectively, the perpendicularity of which to the axis 26 of the reference bores 18 and 20 is to be measured. The inner surfaces 22 and 24 may be, as shown, the faces of internal bosses on the walls 12 and 14, in which case they are frequently of annular outline. FIGURES 1 to 7 inclusive show a surface perpendicularity bore gauge, generally designated 30 for measuring the perpendicularity, or departure therefrom, of the farther internal surface 24 relatively to the central axis 26 of the bores 18 and 20, and FIGURE 8 a similar gauge 180 for measuring the perpendicularity of the nearer inner surface 22 relatively to the same central axis 26. Since the construction of the gauge 180 of FIGURE 8 is similar to that of FIGURE 1, and differs only slightly in detail, the same reference numerals are used in FIGURE 8 as in FIGURES 1 to 7 inclusive for corresponding parts.

The surface perpendicularity bore gauge 30 consists generally of a conventional dial indicator 32 mounted on the rearward end of a hollow rearward stem 34 which in turn is seated and rotatably mounted in the rearward end of a rotary cylindrical block or handle 36. In the forward end of the cylindrical block or handle 36 is mounted a forward hollow stem 38, from the forward end of which a measuring element or feeler 40 projects radially. The feeler 40 has a toroidal feeler head 42 mounted on the outer end of a threaded shank 44.

The threaded shank 44 of the feeler 40 at its inner end is threaded into a correspondingly threaded radial socket or blind hole (FIGURE 5) near the forward end 46 of a rotatable and reciprocable motion-transmitting rod 48 of elongated cylindrical shape. The rod 48 is rotatably and reciprocably mounted in a longitudinal bore 50, the axis 52 of which is spaced radially away from but disposed parallel to the central axis 26 of the coaxial bores 18 and 20, which is also the central axis of the cylindrical outer surface 54 of the forward hollow stem 38. In other words, the bore 50 is decentered relatively to the external surface 54 of the forward hollow stem 38, and the latter is provided with a sector-shaped radial recess 56 into which the feeler 40 can be retracted into the dotted line position shown in FIGURE 5, in response to rotation of the motion-transmitting rod 48 in the manner described below. The sector-shaped recess 56 is provided with right-hand and left-hand end walls or shoulders 57 and 59 respectively.

The forward end of the motion-transmitting rod 52 terminates at the end wall 58 of the longitudinal bore 50. Mounted on the exterior of the hollow forward stem 38 on a reduced diameter forward end portion 60 thereof is a split bushing 62, the external cylindrical surface 64 of which accurately fits the bore 20, with the longitudinal slots 66 thereof providing a slight amount of yield to insure a snug fit. The forward end of the hollow forward stem 38 is provided with a disc-shaped end cap 68 which is drilled and countersunk centrally to receive a screw 70 threaded into the forward end portion 60 of the hollow forward stem 38.

The rearward portion of the hollow forward stem 38 is likewise provided with a reduced diameter portion 72 also of cylindrical shape and similarly provided with a similar split bushing 74 of like construction and similarly snugly fitting the nearer bore 18 of the nearer wall 12 of the machine structure 10.

Also mounted on the reduced diameter portion 72 of the hollow forward stem 38 is a stop collar 76 (FIGURES 1 and 4) drilled and threaded radially to receive a locking set screw 78. The stop collar 76 determines the depth to which the stem 38 of the gauge 30 can be inserted, halting the latter when the stop collar 76 engages the outer surface 80 of the nearer wall 12.

The cylindrical block or handle 36 is likewise mounted on the reduced diameter rearward portion 72 of the hollow forward stem 38 and spaced from the stop collar 76 by a spacing ring or sleeve 82. The block 36 is likewise drilled radially to receive a locking set screw 84 which passes through the forward reduced diameter bore 86 of the block 36 into locking engagement with the reduced diameter portion 72 of the stem 38. The rearward end of the stem 38 is provided with a counterbore 88 which is coaxial with the axis 26 of the stem 38 and bores 18 and 20 and which communicates with the eccentric bore 50 in which the rod 48 is rotatably and reciprocably mounted.

The cylindrical block or handle 36 has an external cylindrical surface 90 which may be knurled for convenience of grasping. The block 36 is also provided with a cylindrical eccentric counterbore 92 coaxial with the bore 88 and hence coaxial with the axis 26 and rotatably receiving the hollow rearward stem 34 in abutting engagement with the radial wall or annual shoulder 94 between the bores 92 and 88. The forward hollow stem 34 is provided with an annular groove 96 (FIGURE 1) which is engaged by the reduced diameter end 98 of a cylindrical retaining pin 100 which is held within a radial bore 102 in the block 36 by a threaded plug 104 threaded into the correspondingly threaded counterbore 106 in which the outer end of the radial bore terminates.

The rearward hollow stem 34 is retained and momentarily locked in either one of two positions of the feeler 40 (namely the extended and retracted positions) by a locking device, generally designated 110 (FIGURES 1 and 7). For this purpose, the hollow stem 34 is provided with a central longitudinal bore 112 coaxial with the axis 52 of the bore 50 with which the counterbore 92 is also coaxial. Communicating with the bore 112 are two circumferentially-spaced radial bores 114 and 116 interconnected by an arcuate device 118 in the rearward hollow stem 34 (FIGURE 7). The locking device 110 is provided with a locking pin 120, the enlarged head 122 of which is reciprocable within a bore 124 in the hollow stem 126 of the locking device 110 and is normally urged by a compression spring 128 to enter the radial bores 114 or 116 or to engage the bottom surface 130 of the arcuate groove 18, whichever happens to be momentarily in alignment with the pin 120. In the position shown of the pin 120 in FIGURE 7, the rod 48 has been rotated and held with the feeler 40 in its extended or measuring position. The radial bore 116 receives the head 122 of the locking pin 120 when the rod 48 has been rotated to swing the feeler 40 into its dotted line retracted position within the sector-shaped recess 56 of FIGURE 5, as explained below on connection with the operation of the invention. A flat spot near the outer end of the locking pin 120 is engaged by the inner end of a set screw 132 threaded through a radially drilled and threaded knurled head or knob 134. The inner side of the head 134 is provided with a diametral rib 136 which engages a corresponding deep diametral notch or groove 138 (FIGURE 3) in the enlarged outer end portion 140 of the stem 126. Spaced circumferentially ninety degrees away from the deep notch or groove 138 is a shallow diametral notch or groove 139. The block or handle 36 is drilled in alignment with the axis of the bore 112 (FIGURE 7) to snugly receive the hollow stem 126 which is held thereby by a set screw 142 against a flat spot thereon.

The rearward hollow stem 34 is drilled and threaded radially to receive a guide screw 144. Press-fitted upon the rearward end of the motion-transmitting rod 48 is a bearing bushing 146 (FIGURES 1 and 3) which in turn is longitudinally slotted as at 148 to receive and slidably engage the inner end of the guide screw 144. The bearing bushing 146 slidably engages the rearward end of the bore 112 and is urged to the right, together with the motion-transmitting rod 48, by a compression spring 150 (FIGURE 1) so as to urge the feeler head 42 into engagement with the farther surface 24. The rearward end of the spring 150 abuts a radial shoulder 152 between the bore 112 and a reduced diameter bore 154 coaxial therewith.

Mounted in the reduced diameter bore 154 and fixedly secured therein is the hollow stem 156 containing the spring-pressed reciprocable plunger 158 of the dial indicator 32. The rounded end of the dial indicator plunger 158 engages the flat rearward end 160 of the motion-transmitting rod 48. As a consequence, any axial motion of the rod 48 correspondingly moves the dial indicator plunger 158 and communicates this motion through the conventional internal mechanism (not shown) of the dial indicator 32 to the needle shaft 162 thereof (FIGURE 2). The consequent rotation of the needle shaft 162 swings the indicating needle 164 relatively to the graduated circular scale 166 on the dial 166 of the dial indicator 32.

Mounted upon the rearward end portion of the rearward hollow stem 34 is a short sleeve 170 (FIGURES 1 and 3) which extends between the cylindrical block or handle 36 and the back surface 172 of the case 174 of the dial indicator 32. The sleeve 170 is provided with diametrically opposite bosses 176 (FIGURE 3) which are drilled and threaded diametrically to receive set screws 178 by which the sleeve 170 is locked to the forward hollow stem 34.

The modified surface perpendicularity bore gauge, generally designated 180, shown in FIGURE 8 is for the most part identical in construction with the gauge 30 just described in connection with FIGURES 1 to 7 inclusive, hence corresponding parts are designated with the same reference numerals. Because the gauge 180 is intended to measure the perpendicularity of the nearer inner surface 22, the feeler 40 naturally is located adjacent that surface rather than adjacent the reduced diameter forward end portion 60 of the forward hollow stem 38. As a consequence, the sector-shaped recess 56 is likewise located adjacent the nearer inner surface 22 and motion-transmitting rod 48 and longitudinal bore 50 terminate intermediate the opposite ends of the forward hollow stem 38. The forward ends 46 of the motion-transmitting rod 48 and 58 of the bore 50, however, are spaced apart from one another to receive a compression spring 182 which urges the motion-transmitting rod 48 to the left so as to urge the feeler head 42 to the left against the surface 22.

In the operation of either of the surface perpendicularity bore gauges 30 or 180 of FIGURES 1 or 8 respectively, the operator grasps the handle 36 in one hand and with the other hand pulls outward upon the knurled head 134 of the locking device 110 to withdraw the diametral rib 136 from the notch or groove 138 in the outer end portion 140 of the stem 126. With the knurled head 134 thus withdrawn, he rotates it and its rib 136 ninety degrees so that it snaps into the shallow diametral notch 139. With the head 122 of the locking pin 120 thus withdrawn from the radial bore 114 in the rearward hollow stem 34 (FIGURE 7), the operator shifts his grasp of his right hand from the locking device 110 to the dial indicator casing 174 and holds the latter stationary while he rotates the cylindrical block or handle 36 counterclockwise to correspondingly rotate the hollow forward stem 38 and consequently to move the left-hand wall 59 of the sector-shaped recess 56 away from and the right-hand wall 57 toward the feeler 40, thereby withdrawing or retracting the feeler 40 into the dotted line position shown in FIGURE 5. The operator then thrusts the forward hollow stem 58 through the bores 18 and 20 until the stop collar 76 engages the outer surface 80 of the nearer wall 12 of the machine structure 10.

He then reverses the foregoing operation to extend the feeler 40 by swinging the head 134 of the locking device 110 and the forward hollow stem 38 connected to it in a clockwise direction, moving the end wall 59 toward and the end wall 57 of the recess 56 away from the feeler 40, causing its head 42 to move out of the recess 56 into the measuring position shown in FIGURES 1 and 5. The operator then pulls outward on the head or knob 134 to withdraw the rib 136 from the shallow groove 139 and rotates it to align the rib 136 with the deep groove 138, whereupon the spring 128 (FIGURE 7) urges the head 122 of the locking pin 120 into the radial bore 114 and locks the parts rigidly in measuring position.

The operator then rotates the cylindrical block or handle 36 to swing the head 42 of the feeler 40 in a circular path around the surface 24, any lack of perpendicularity of which relatively to the axis 26 causing the head 42 of the feeler 40 and motion-transmitting rod 48 to move axially. The axial motion of the rod 48 from lack of perpendicularity of the surface 24 is transmitted to the dial indicator plunger 158 by the rearward end 160 of the rod 48, whereupon the dial indicator mechanism swings the needle shaft 162 and needle 164 to indicate the lack of perpendicularity upon the graduated scale 166. The operator then repeats the retraction action described above to retract the feeler 40 into the sector-shaped recess 56 and then withdraws the forward hollow stem 38 from the bores 18 and 20.

The operation of the modified surface perpendicularity bore gauge 180 of FIGURE 8 is substantially identical with that just described for the gauge 30, including the initial retraction of the feeler 40 into its recess, the insertion of the hollow forward stem 38 through the coaxial bores 18 and 20 of the machine structure walls 12 and 14, the extension of the feeler 40 by reverse rotation of the handle 36 relatively to the dial indicator 32, and the carrying out of the measuring operation of the perpendicularity of the nearer inner surface 22 relatively to the axis 26 of the bores 18 and 20. Retraction of the feeler 40 is then carried out by reversing the procedure as described above so as to withdraw the feeler 40 into the recess 56, whereupon the forward hollow stem 38 is withdrawn from the bores 18 and 20 as before.

I claim:

1. A gauge for measuring the perpendicularity of a surface of a workpiece behind a reference bore relatively to the axis of said bore, said gauge comprising
   a hollow elongated support snugly but rotatably fitting the reference bore and insertable therethrough,
   said support having a feeler-receiving recess therein,
   a stop element on said support adapted to engage the workpiece,
   elongated motion-transmitting means essentrically mounted in said support for rotational and reciprocatory motions relatively thereto,
   a surface-perpendicularity-measuring feeler fixedly mounted on said motion-transmitting means adjacent said feeler-receiving recess and disposed transversely to said motion-transmitting means,
   said feeler being movable between a retracted position inside said recess and an extended position outside said recess,
   a handle structure connected to said support remote from said feeler,
   a rotary feeler retractor structure fixedly connected to said motion-transmitting means and connected to said handle structure for rotation relatively thereto,
   a locking device disposed between said structures for selectively locking and unlocking said structures for unitary and relative rotation thereof respectively,
   a dial indicator mounted on one of said structures and having a reciprocable operating element operatively connected to said motion-transmitting means and reciprocable in response to the reciprocatory motion of said motion-transmitting means,
   rotational motion of said hollow elongated support relatively to said motion-transmitting means in opposite directions respectively extending and retracting said feeler out of and into said recess.

2. A bore-inserted surface perpendicularity gauge, according to claim 1, wherein a rotary handle is operatively connected to said hollow elongated support, and wherein said extending and retracting means is operable in response to rotation of said hollow elongated support by said rotary handle.

3. A bore-inserted surface perpendicularity gauge, according to claim 1, wherein a second reference bore is disposed in spaced coaxial relationship with said first-mentioned bore, and wherein said support includes a portion thereof rotatably insertable in said second reference bore with said feeler disposed in the space between said bores.

4. A bore-inserted surface perpendicularity gauge, according to claim 1, wherein said handle structure has a bearing opening therein and wherein said feeler retractor structure is rotatably mounted in said bearing opening.

5. A bore-inserted surface perpendicularity gauge, according to claim 1, wherein said structures overlap one another and wherein one of said structures has circumferentially-spaced lock-receiving holes therein, and wherein said locking device is mounted on the other structure in selective alignment with said holes.

6. A bore-inserted surface perpendicularity gauge, according to claim 1, wherein a resilient element is disposed in engagement with said motion-transmitting means and urges said feeler on said motion-transmitting means into contacting engagement with the surface of which the perpendicularity is to be measured.

7. A bore-inserted surface perpendicularity gauge, according to claim 2, wherein said operating element of said dial indicator comprises a reciprocable plunger reciprocably engaged by said motion-transmitting means.

8. A bore-inserted surface perpendicularity gauge, according to claim 1, wherein said recess is approximately of sector-shaped cross-section with approximately radial end walls, and wherein said feeler is swung arcuately between said end walls in moving between its extended and retracted positions.

References Cited

UNITED STATES PATENTS

| | | | |
|---|---|---|---|
| 1,110,879 | 9/1914 | Brown | 33—143 |
| 2,563,440 | 8/1951 | Wilson et al. | 33—143 |
| 3,016,619 | 1/1962 | Mueller | 33—172 |

SAMUEL S. MATTHEWS, *Primary Examiner.*